Aug. 2, 1949. H. E. DICKERMAN Re. 23,138
TOOL
Original Filed Dec. 27, 1944
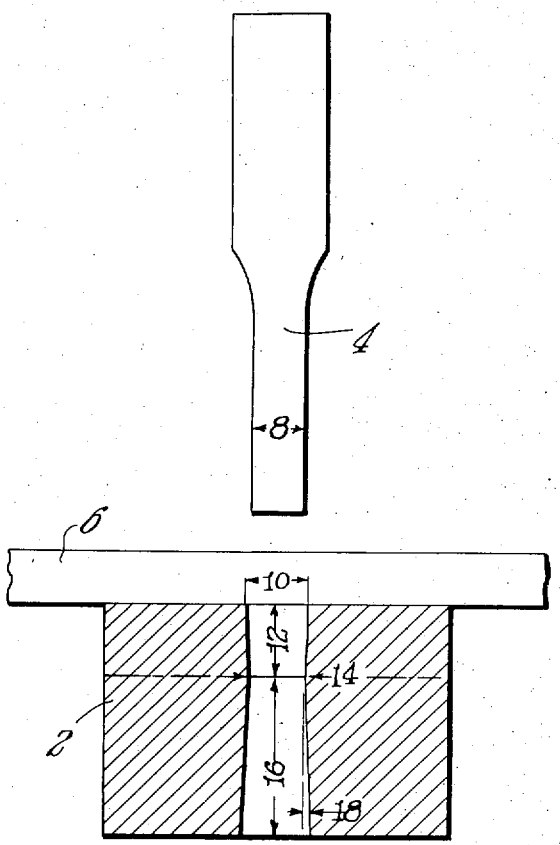
INVENTOR.
Hubert E. Dickerman.
BY Walter C. Ross.
Attorney.

Reissued Aug. 2, 1949

Re. 23,138

UNITED STATES PATENT OFFICE 23,138

TOOL

Hubert E. Dickerman, Springfield, Mass.

Original No. 2,404,793, dated July 30, 1946, Serial No. 569,956, December 27, 1944. Application for reissue June 29, 1948, Serial No. 35,908

7 Claims. (Cl. 164—124)

This invention relates to tools and is directed more particularly to apparatus for punching operations and the like.

The principal objects of the invention are directed to apparatus for punching operations and the like which is characterized by novel features that increase life of the tool, decrease power consumption, obviate galling and seizing of punch and die and reduce shut-down time in general.

According to prior practice galling and seizing of a punch and die is a frequent difficulty due to improper relative dimensions of the punch and die which results in improper "break" and the slugs punched out from a piece of metal tend to jump upwardly and outwardly from the die if certain present used dimensions are used. This frequently causes great damage to the apparatus due to the slugs becoming caught therein.

According to this invention, the punch and die are relatively proportioned to provide a correct "break" as the slug is punched from the stock thereby to obviate galling and seizing of the punch and die while by reason of the novel form of the punch and die the blank punched is prevented from jumping upwardly and outwardly from the die.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawing wherein the single figure is a sectional elevational view through a die showing a piece of stock thereon and a punch for cooperating with the die for punching a hole in the stock.

Referring now to the drawing in detail, the invention will be more fully described. In describing the invention reference will be made to a piece of stock, ordinary steel, in which it is desired to punch a round hole. For illustrative purposes, it will be assumed that the stock is ⅛" in thickness and that the hole to be punched therein will be ⅛" in diameter.

A die is represented by 2 which, as shown, has a hole for a punch 4. A piece of metal is represented by 6 which is placed between the punch and die. It will be understood that the punch and die are suitably associated with relatively movable members of press apparatus whereby the punch is forced through the piece 6. As an example, where the hole in the metal member 6 is to be ⅛" in diameter the finished hole must be .125" minus .001" or plus .001".

To produce such a punched hole, the diameter 8 of the punch will be .1263" minus .0007" or plus .0002". The entrance diameter 10 of the hole in the die will be about 10% greater than the diameter of the punch or .1388" minus .001" or plus .000".

The depth of the hole in the die or thickness of the die will be great enough to allow for a restricted throat or diameter therein which is disposed downwardly from the entrance thereof a distance 12 that is greater than the thickness of the stock and preferably which is equal to about one and one-half times the thickness of the stock.

The diameter 14 of the restriction or throat will be slightly greater than the diameter of the punch and slightly smaller than the top of the hole preferably .1368" minus .0005" or plus .000". The dimensions given will not only provide the desired "break" for the stock but will provide a hole in the die having an upper part that converges downwardly from its entrance to the restriction or throat as shown.

The dimension 16 of the die from the restriction downwardly may vary and if desired the die may be formed from cooperating upper and lower parts having adjacent faces in contiguous relation on a plane represented by a dash-dot line passing through the restricted part of the hole in the die. The sides of the lower portion of the hole in the die converge downwardly from the restriction at an angle 18 from ¼ to ¾ of a degree on each side.

In operation, as the punch is moved downwardly to engage the stock and punch a plug downwardly into and through the hole in the die, the break and the relative dimensions are such that seizing and galling are eliminated while the punched slug is pushed downwardly in the hole in the die past or into the restriction thereof. As the punch is moved upwardly relative to the die, the slug is prevented from jumping upwardly or being drawn upwardly out of the hole in the die by adhering to the end of the punch.

The dimensions given not only produce a correct break so as to provide a clean hole in the stock but the difficulties caused by galling and seizing are obviated thereby increasing useful tool life and decreasing the power requirements.

The example given is in connection with ordinary steel stock, say 1020 S. A. E., but the features of the invention may be adapted to other grades and thickness of metal by changes and modifications which may be made within the scope of the invention.

While in the form of the invention described, dimension 10 of the entrance to the hole is about 10 percent greater than the diameter 8 of the punch the percentage may vary according to stock and diameter of hole to be punched from 5% to 13%.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A punching construction comprising in combination, a punch and a die having a punch receiving hole therein, said hole having a restricted portion disposed downwardly from the entrance thereof, and the side walls of the hole diverging in opposite directions from said restricted portion, the diameter of the restricted portion of the hole being from 5 to 13% greater than the diameter of the punch.

2. A punching construction comprising in combination, a punch and a die having a punch receiving hole therein, said hole having a restricted portion disposed downwardly from the entrance thereof, and the side walls of the hole diverging in opposite directions from said restricted portion, the diameter of the restricted portion of the hole being 10% greater than the diameter of the punch.

3. A punch and die construction comprising in combination, a punch of a certain diameter, a die having a punch receiving hole therethrough, the upper entrance of said hole being from 5 to 13% greater in diameter than said certain diameter with the sides of the hole converging downwardly from said upper entrance of the hole to form a restricted portion of the hole intermediate the ends of the hole which is slightly greater in diameter than said certain diameter and the sides of the hole diverging downwardly from said restricted portion to the lower portion of said hole at an angle of one-quarter to three-quarters of a degree on a side relative to the longitudinal axis of said hole.

4. A punching construction for punching a hole in stock of certain thickness comprising in combination, a punch and a die having a punch receiving hole therein, said hole having an entrance and a restricted portion disposed downwardly therefrom with the side walls of said hole diverging upwardly from said restricted portion to said entrance and diverging downwardly therefrom, the dimensions of said entrance being relatively greater than said punch by 5% to 13% of the said certain thickness of stock.

5. A punching construction for punching a hole in stock of certain thickness comprising in combination, a punch and a die having a punch receiving hole therein, said hole having an entrance and a restricted portion disposed downwardly therefrom with the side walls of said hole diverging upwardly from said restricted portion to said entrance and diverging downwardly therefrom, the dimensions of said entrance being relatively greater than said punch by 5% to 13% of the said certain thickness of stock, and the dimensions of said restricted opening being slightly less than of said entrance and greater than said punch.

6. A punching construction for punching a hole in stock of certain thickness comprising in combination, a punch and a die having a punch receiving hole therein with the punch receiving hole having an upper entrance and a restricted portion disposed downwardly therefrom with the side walls of the punch receiving hole diverging upwardly from the restricted portion to the upper entrance and diverging downwardly from the restricted portion, the dimension of the upper entrance being relatively greater than the dimension of said punch by 5% to 13% of the dimension of said certain thickness of stock.

7. A punching construction for punching a hole in stock of certain thickness comprising in combination, a punch and a die having a punch receiving hole therein with the punch receiving hole having an upper entrance and a restricted portion disposed downwardly therefrom with the side walls of the punch receiving hole diverging upwardly from the restricted portion to the upper entrance and diverging downwardly from the restricted portion, the dimension of the upper entrance being relatively greater than the dimension of said punch by 5% to 13% of the dimension of said certain thickness of stock, and the dimension of the restricted portion being slightly less than the dimension of the upper entrance and slightly greater than the dimension of said punch.

HUBERT E. DICKERMAN.

REFERENCES CITED

The following references are of record in the file of this patent:

UNITED STATES PATENTS

| Number | Name | Date |
|---|---|---|
| 2,369,896 | Harris | Feb. 20, 1945 |